United States Patent
Alyassin et al.

(10) Patent No.: US 6,625,565 B1
(45) Date of Patent: Sep. 23, 2003

(54) METHOD AND APPARATUS FOR DETERMINING AN UNSUPERVISED PLANAR GEODESIC PATH

(75) Inventors: Abdalmajeid M. Alyassin, Schenectady, NY (US); Boris Yamrom, Schenectady, NY (US); James V. Miller, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 166 days.

(21) Appl. No.: 09/585,004

(22) Filed: Jun. 1, 2000

(51) Int. Cl.$^7$ .......................... G01B 7/26; G01B 13/16; G01B 15/04

(52) U.S. Cl. ...................................................... 702/167

(58) Field of Search ........................... 702/94, 95, 97, 702/127, 150, 151, 152, 153, 155, 157, 158, 167, 168, 183; 700/56, 61, 186, 187, 194, 195, 245, 250, 251; 382/106, 154, 242, 285; 33/700, 710

(56) References Cited

U.S. PATENT DOCUMENTS

| | | | | |
|---|---|---|---|---|
| 4,831,528 A | * | 5/1989 | Crawford et al. | 382/131 |
| 5,463,568 A | * | 10/1995 | Oyama et al. | 702/158 |
| 5,481,465 A | * | 1/1996 | Itoh et al. | 700/118 |
| 5,668,894 A | * | 9/1997 | Hamano et al. | 382/242 |
| 5,946,645 A | * | 8/1999 | Rioux et al. | 702/155 |
| 6,012,022 A | * | 1/2000 | Michiwaki | 702/168 |
| 6,044,309 A | * | 3/2000 | Honda | 700/187 |
| 6,169,917 B1 | * | 1/2001 | Masotti et al. | 600/407 |
| 6,260,000 B1 | * | 7/2001 | Karasaki et al. | 702/155 |
| 6,271,856 B1 | * | 8/2001 | Krishnamurthy | 345/429 |
| 6,343,936 B1 | * | 2/2002 | Kaufman et al. | 434/262 |

OTHER PUBLICATIONS

International Search Report mailed Nov. 15, 2002 from the European Patent Office—6 pages.

Rached Zantout and Yuan Zheng, "Determining Geodesics of a Discrete Surface," *Proceedings of the 1994 IEEE International Conference on Multisensor Fusion and Integration for Intelligent Systems, Las Vegas, NV*, Oct. 2–5, 1994; pp. 551–558.

Jack Lancaster, et al., "A Geometric Model for Measurement of Surface Distance, Surface Area, and Volume From Tomographic Images," *Medical Physics*, Mar./Apr. 1992, pp. 419–431.

Pankaj Agarwal, et al., "Approximating Shortest Paths on a Convex Polytope in Three Dimensions," *Journal of the ACM*, vol. 44, No. 4, Jul. 1997, pp. 567–584.

* cited by examiner

*Primary Examiner*—John Barlow
*Assistant Examiner*—Demetrius Pretlow
(74) *Attorney, Agent, or Firm*—Hughes & Luce LLP

(57) ABSTRACT

The present invention provides a system and method for performing three-dimensional surface measurements of a path length along a surface. The method for determining the path length along the surface of a three-dimensional object includes the step of first selecting a first and second point on the three-dimensional surface. A plane is then defined which contains both the first and second points. A determination is then made to find the shortest path curve between the first point and second point which is defined by the intersection of the three-dimensional object with the plane. This path length is recorded for future comparison. A series of subsequent planes is defined that contains the first and second point, wherein these planes are rotated at an angle to each other. A determination is then made for the shortest path length associated with each subsequent plane. The overall shortest path length is the minimum of these recorded path lengths.

20 Claims, 4 Drawing Sheets

METHOD AND APPARATUS FOR DETERMINING AN UNSUPERVISED PLANAR GEODESIC PATH

TECHNICAL FIELD OF THE INVENTION

The present invention relates generally to 3-D surface measurement systems and methods, and more particularly, a system and method for determining Planar Path lengths along a surface of a 3-D object.

BACKGROUND OF THE INVENTION

Pathfinding allows access to important spatial information such as the path length and shape along an object's surface between two points. Measuring the Euclidean distance (ED) between two points in the Euclidean space coordinate is a common measurement procedure in industrial and medical applications. This measurement represents the shortest linear path between the two points. However, if the desired path between the two points is not linear then the ED does not provide an accurate length.

The difficulty is not how to measure the length of a curve confined between two points; rather, the difficulty is how to find a curve that satisfies a special relationship between two points. For instance, finding the shortest path between two points along a non-planar three-dimensional surface is difficult. An infinite number of curves exist between the two points. These curves can be planar or non-planar. In addition, determining the shortest path between the two points adds complexity to the problem. One common solution is to manually outline the expected shortest path. This manual technique is time consuming and tedious, especially when the two points cannot be viewed simultaneously. More importantly, although the accuracy may be acceptable, the precision of the manual technique is poor and user dependent.

Therefore, a more precise method of determining the shortest path between two points located on a three-dimensional surface (geodesic) in an unsupervised manner and timely fashion is needed. Such a technique would be applicable to inspection techniques for measuring the dimensions of mechanical parts or other similar structures.

SUMMARY OF THE INVENTION

The present invention provides a system for performing three-dimensional surface measurements that substantially eliminates or reduces disadvantages and problems associated with previously developed surface measurement techniques.

More specifically, the present invention provides a method for path length determination along the surface of a three-dimensional object. The method for determining the path length along the surface of a three-dimensional geodesic includes the steps of first selecting a first and second point on the three-dimensional surface. A plane is then defined which contains both the first and second points. The intersection of the three-dimensional object with the plane defines the shortest path curve between the first point and second point. This path length is recorded for future comparison. A series of subsequent planes is defined that contains the first and second point, wherein these planes are oriented at an angle to the previous planes. A determination is then made for the shortest path length associated with each subsequent plane. The overall shortest path length is the minimum recorded path length from all planes examined.

The present invention provides an important technical advantage in that a computer system can be constructed that is operable to execute a set of instructions using the methods provided by vector calculus, in an unsupervised manner, to determine the minimum path lengths for any given geodesic examined with the method of the present invention.

More importantly, the present invention provides a key technical advantage in that prior art systems relied on inaccurate manual techniques, while the present invention eliminates these user-dependent manual techniques in favor of a computer-supervised measurement system. The method of the present invention eliminates precision errors associated with manual techniques of prior art systems.

The method of the present invention provides yet another important technical advantage in that the method of the present invention can be executed by an unsupervised computer system wherein the computer is operable to evaluate all path lengths in a timely fashion.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention describes a technique of finding the shortest planar curve that is confined between two points on a three-dimensional surface in a timely fashion. The shortest path identified by the method of the present invention will either be the true or an approximation of the shortest planar curve that is confined between the two points. If the shortest path is actually a planar path, then the proposed technique provides a true answer, otherwise, the present invention will provide an approximation of the shortest planar curve.

Figure 1:
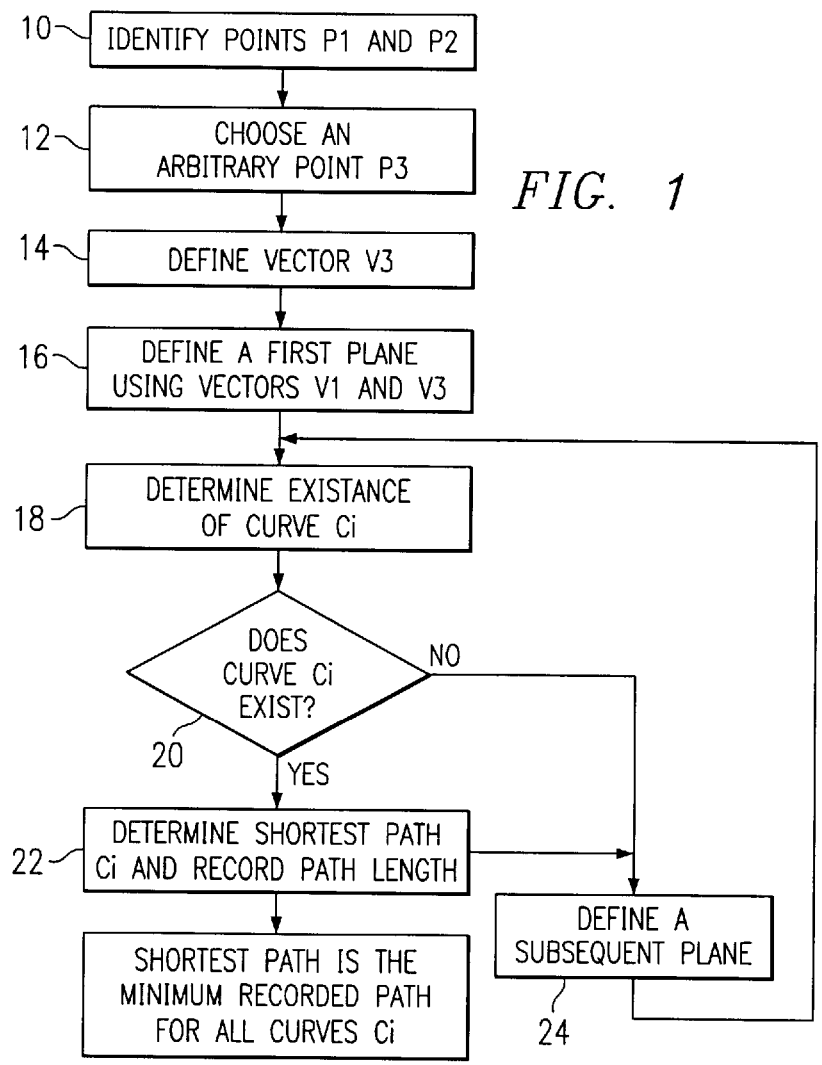
FIG. 1 illustrates a flowchart providing the method of the present invention.
Figure 2:
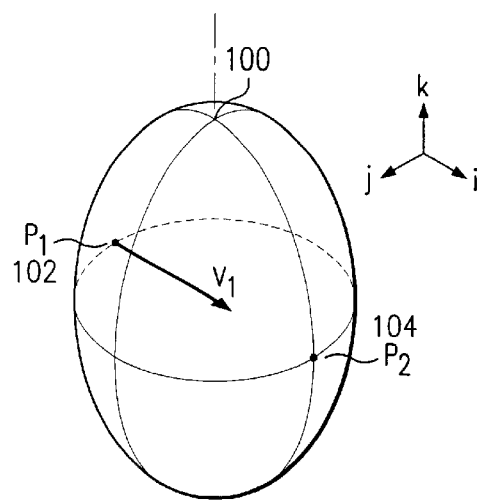
FIG. 2 provides a three-dimensional geodesic 100 to be inspected using the method of the present invention.

FIG. 1 illustrates a flowchart providing the method of the present invention. This method may be executed on a computer operable to execute a software engine containing instructions equivalent to the steps as outlined below. Beginning with step 10, two points, $P_1$ 102 and $P_2$ 104, are identified on the three-dimensional surface 100. These points are represented in FIG. 2. FIG. 2 provides a three-dimensional surface 100 to be inspected using the method of the present invention. Two arbitrary points $P_1$ 102 and $P_2$ 104 have been chosen between which a shortest planar curve will be determined in order to illustrate the method of the present invention. The selection of points $P_1$ 102 and $P_2$ 104 may be accomplished through the use of a graphical user interface containing a representation of the three-dimensional surface.

Figure 3:
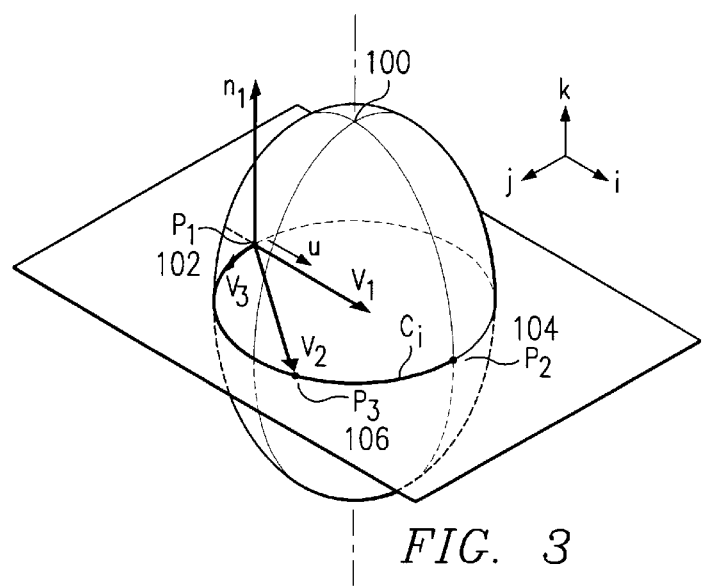
FIG. 3 shows a first plane intersecting the geodesic.

At step 12, an arbitrary point $P_3$ 106 is chosen. This is illustrated in FIG. 3. $P_3$ 106 falls on vector $V_2$ and does not fall along vector $V_1$. Equation 1 and equation 2 define V1 and V2.

$$V_1 = (X_2 - X_1)i + (Y_2 - Y_1)j + (Z_2 - Z_1)k \qquad \text{EQN 1}$$

$$V_2 = (X_3 - X_1)i + (Y_3 - Y_1)j + (Z_3 - Z_1)k \qquad \text{EQN 2}$$

Vector u is the unit vector associated with vector $V_1$. These vectors are graphically depicted in FIG. 3.

At step 14, vector $V_3$ is defined such that vector $V_3$ is perpendicular to $V_1$ using equation 3 as shown below:

$$V_3 = V_2 - (V_2 \cdot u)u \qquad \text{EQN 3}$$

NOTE: ($V_2 \cdot u$) is the dot product between $V_2$ and u.

At step 16, a plane is defined using vectors $V_1$ and $V_3$. This plane has a normal vector $n_1$ along the path of the cross-product between vectors $V_1$ and $V_3$. Note that since the normal $n_1$ is the cross-product between vectors $V_1$ and $V_3$ that $n_1$ and $V_1$ are by definition perpendicular. The plane defined using vectors $V_1$ and $V_3$ shall be a plane determined by vector $n_1$ where $n_1$ is the normal vector orthogonal to the plane containing point $P_1$, point $P_2$, vector $V_1$, vector $V_2$, and vector $V_3$.

At step 18, the intersection between the plane with the three-dimensional object is a curve, $C_1$, that contains points, $P_1$ and $P_2$. At decision point 20, a determination is made as to the existence of a connected curve between points $P_1$ and $P_2$. If no connected curve is found, there is not a planar path associated with this intersection, in which case, one proceeds directly to step 24.

Figure 4:
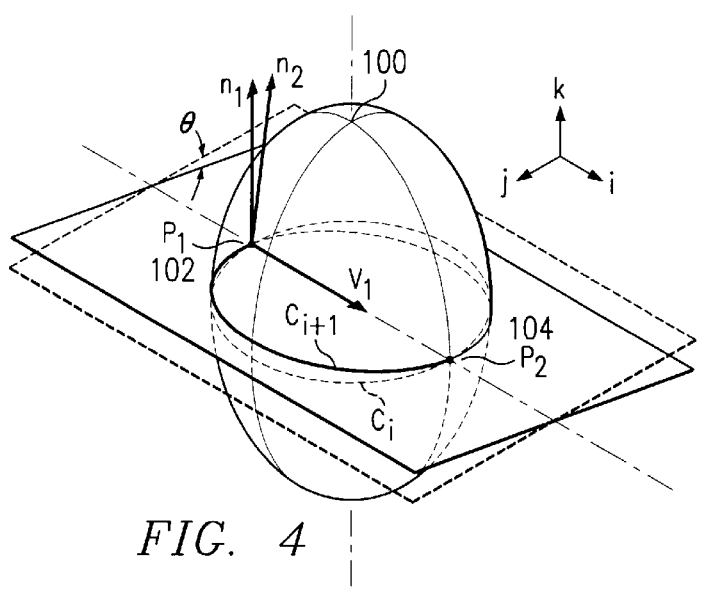
FIG. 4 illustrates a subsequent plane oriented at an angle $\Delta\phi$ to the first plane intersecting the geodesic.

At step 24, a subsequent plane is defined by point $P_1$ and a normal vector in $n_2$, wherein $n_2$ is rotated an angle theta φ from $n_1$ about an axis containing points $P_1$ and $P_2$. This subsequent plane contains point $P_2$ and is illustrated in FIG. 4. At this point, steps 18–24 are repeated as φ is incremented from 0–180°. The increment angle delta theta, Δφ, is adjusted according to the desired speed of the pathfinding algorithm. A small increment angle, Δφ, leads to a slower technique but a more accurate result. A large increment angle leads to a faster technique with a penalty in accuracy. The shortest path is determined to be the minimum length of all located paths of subcurve C bounded by points $P_1$ and $P_2$ is measured as theta is adjusted between 0–180°.

Figure 5A:
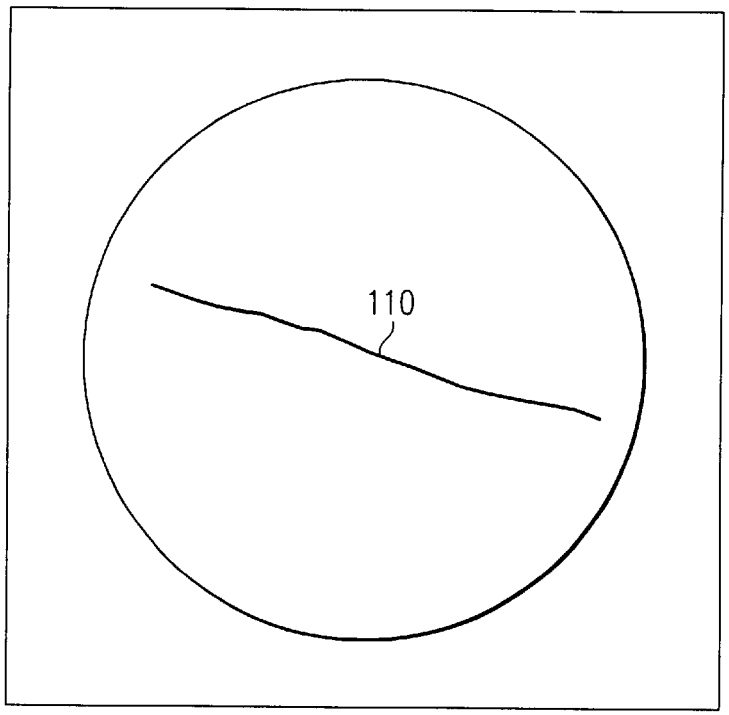
FIGS. 5A and 5B illustrate a comparison of the prior art methods to the present invention as applied to a spherical geodesic.
Figure 5B:
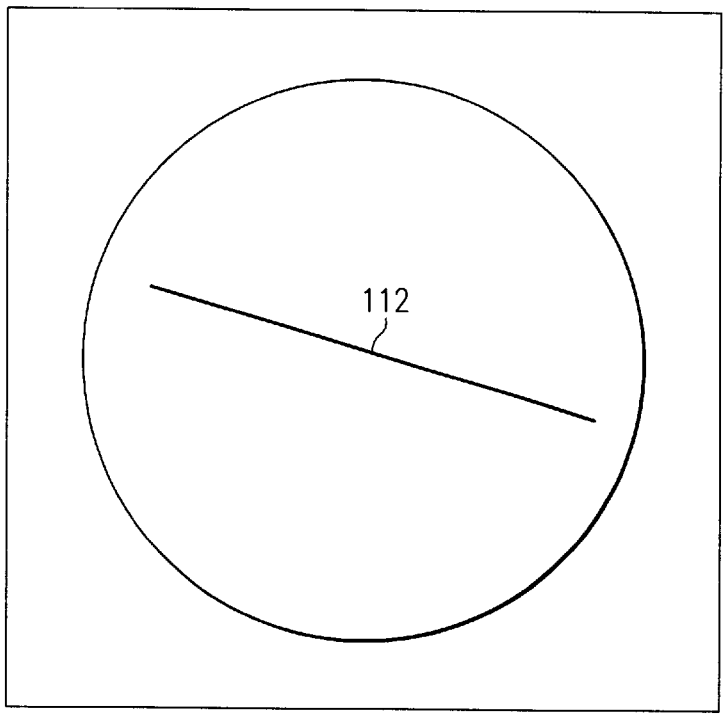
Figure 6A:
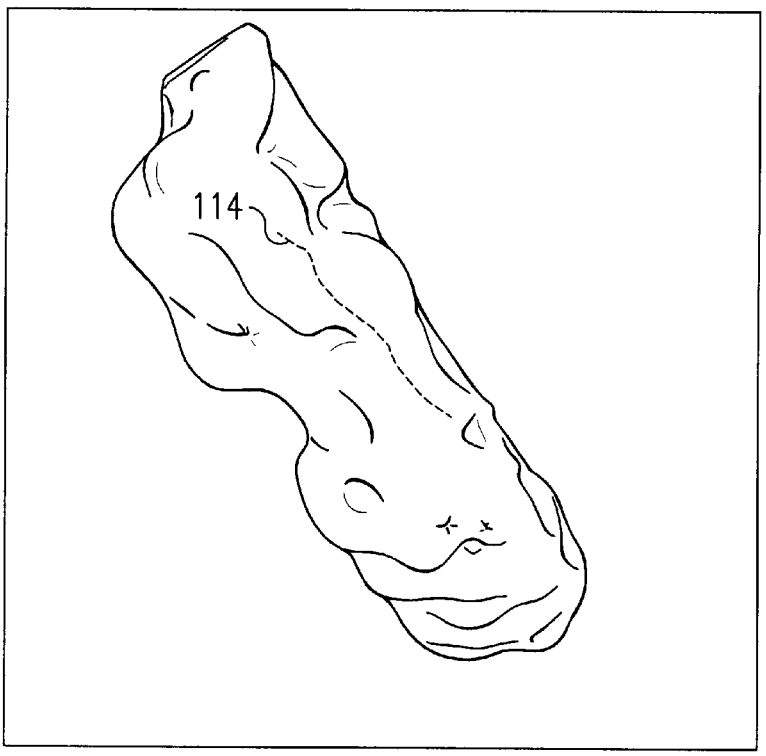
FIGS. 6A and 6B present a comparison of the methods of the prior art and the present invention as applied to the superior frontal gyrus of the human brain.
Figure 6B:
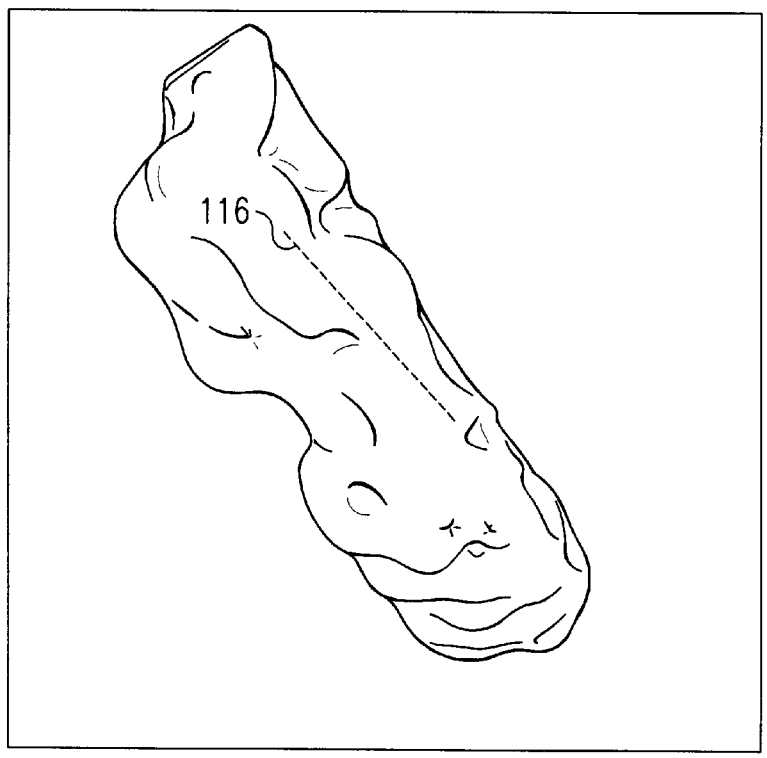

The accuracy and precision of the method presented above and described in FIG. 1 was tested by measuring a known shortest curve between two points on a sphere as presented in FIGS. 5A and 5B. Additionally, the method of the present invention was tested on a convoluted three-dimensional surface representation of a superior frontal gyrus of the human brain as presented in FIGS. 6A and 6B. The results were compared with results obtained from a manual technique. Preliminary testing indicated that the error encountered in the method of the present invention was less than 1%. FIG. 5A shows the manual outline 110 of the suspected shortest path while FIG. 5B shows the automated shortest path 112 resulting from the method of the present invention. FIGS. 6A and 6B show the difference between the result of the manual shortest path 114 and automated shortest path 116 on a gyrus.

The gathering of distance data associated with FIGS. 6A and 6B is important in medical applications. In mapping functions of the nervous system or brain, distance information between points is extremely important as to the relationship of this physiology.

The three-dimensional representation of a biological organ or other component may be determined by MRI, positron emission topography, or other imaging means as known to those skilled in the art. Distance is particularly important in mapping neurofunctions or the physiology of the brain.

Another important medical application of the method of the present invention is to assist in three-dimensional surface mapping for facial reconstruction or other plastic surgery.

Another application of the present invention is to determine least distance path between geographic points, such as two cities, where considerations are made for the topography between the two given points.

Figure 7:
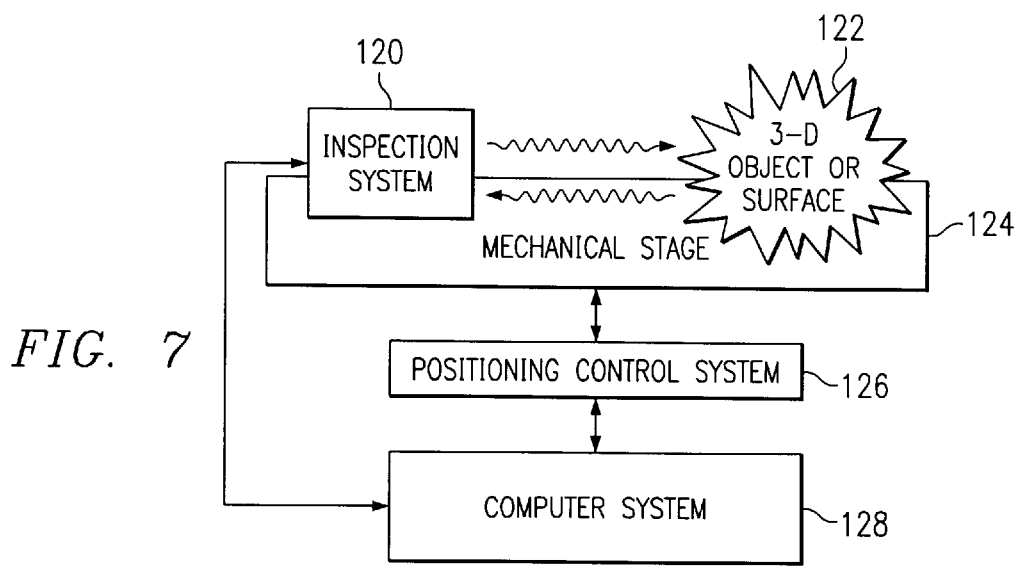
FIG. 7 illustrates an embodiment of the present invention that uses an inspection tool to map surface features of an object.

Yet another embodiment of the present invention may utilize a three-dimensional representation of an object or geodesic created as a computer-simulated representation of the physical geodesic. This computer simulation may be created by mapping the surface features of the object with an inspection tool as shown in FIG. 7. Such a tool may comprise an optical-, laser-, or audio-based inspection system 120 that measures and determines the surface topography of the object 122. A mechanical stage 124 can provide relative motion between the inspection system 120 and the three-dimensional object 122. Repositioning the inspection system 120, three-dimensional 122 or a combination may achieve this relative motion thereof.

The motion of this mechanical stage is driven by a positioning control system 126, which provides an input to a computer system 128. Computer system 128 also receives an input from inspection system 120. These inputs enable computer system 128 to execute a software program operable to create a 3-D computer simulation 130 the physical geodesic 122. Then a representation of the geodesic 122 can be simulated within a computer environment, wherein software engine is operable to execute the method of the present invention within a computer.

In another embodiment of the present invention, inspection system 120 can be used to directly measure a planar path between the two selected points on a physical object. Then the inspection system or the object may be rotated at an incremental angle about an axis defined by the selected points by mechanical stage 124. The direct measurements may consist of a series of point measurements made on the surface of the object in this new plane to determine planar path length. By determining the distances between the series of points, an estimation of the planar distance between the chosen points on the surface can be made. As the distance between consecutive points approaches zero, in theory, the error of this technique approaches zero. Such an inspection system might involve a laser inspection system that measures along a specific plane of the object.

The method of the present invention provides a method of measuring the ED between two points in the Euclidean space coordinate. This measurement represents the shortest linear path between two points. If the desired path between two points is not linear, then the Euclidean distance does not provide an accurate length. However, a more accurate estimation measurement is to subdivide the curve into small linear segments and then to integrate their Euclidean distance measurements. Theoretically, the error in this approximation goes to zero as the size of the linear segments decreases to zero. The method of the present invention allows the examination of all the planar paths between two points on a three-dimensional surface.

The present invention provides an important technical advantage wherein a computer system can be constructed wherein a program using the methods provided in vector calculus are able, in an unsupervised manner, to determine the minimum path lengths for any given geodesic examined with the method of the present invention.

More importantly, the present invention provides another key technical advantage wherein prior art systems relied on inaccurate manual techniques and the present invention eliminates these user-dependent manual techniques in favor of a computer-supervised measurement system. The method of the present invention eliminates precision errors associated with manual techniques of prior art systems.

The method of the present invention provides yet another important technical advantage in that the method of the present invention can be executed by an unsupervised computer system wherein the computer is operable to evaluate all path lengths in a timely fashion.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method of path length determination along the surface of a 3D object, comprising the steps of:
    selecting a first and second point on the surface;
    defining a first plane containing said first point and said second point;
    finding a first shortest path curve on said first plane wherein said curve is defined by an intersection of the surface and said first plane and bounded by said first point and said second point, and wherein a first length of said first shortest path curve is recorded;
    defining a subsequent plane containing said first point and said second point, wherein a first normal vector defining said first plane at said first point is at an angle theta to a subsequent normal vector defining said subsequent plane at said first point;
    finding a subsequent shortest path curve on said subsequent plane wherein said curve is defined by the intersection of the surface with said subsequent plane and bounded by said first point and said second point, and wherein a subsequent length of said subsequent shortest path curve is recorded;
    repeating said step of defining said subsequent plane and finding a subsequent shortest path curve for angles theta between 0 and 180 degrees; and
    determining a minimum shortest path length from said first recorded length and subsequent recorded lengths.

2. The method of claim 1, wherein said step of selecting a first and second point on the surface is accomplished at a graphical user interface where a user can specify said first point and said second point on the surface of the 3D object.

3. The method of claim 1, wherein said step of defining a first plane containing said first point and said second point comprises the steps of:
    selecting a third point on the surface of the 3D object wherein said third point does not fall along a path of a first vector $V_1$ between said first point and said second point;
    defining a second vector $V_2$ between said first point and said third point;
    finding a third vector $V_3$ orthogonal to said first vector $V_1$ wherein said vector $V_3$ is defined by the equation:

$$V_3 = V_2 - (V_2 \cdot u)u$$

wherein u is a unit vector associated with $V_1$;
    finding a normal vector n orthogonal to $V_1$, where n is a unit vector associated with the cross product of vectors $V_1$ and $V_3$; and
    defining said first plane with said normal vector n and said first point.

4. The method of claim 1, wherein said step of repeating said step of defining said subsequent plane and finding a subsequent shortest path curve for an angle theta between 0 and 180 degrees comprises:
    incrementing said angle theta by an increment angle, delta theta, from 0 to 180 degrees.

5. The method of claim 4, wherein a user can specify a increment angle delta theta.

6. A method of path length determination along the surface of a 3D object, comprising the steps of:
    selecting a first point $P_1$ and second point $P_2$ on the surface;
    selecting a third point $P_3$ on the surface wherein said third point does not fall along a path of a first vector $V_1$ between said first point $P_1$ and said second point $P_2$;
    defining a second vector $V_2$ between said first point and said third point;
    finding a third vector $V_3$ orthogonal to said first vector $V_1$ wherein said vector $V_3$ is defined by the equation:

$$V_3 = V_2 - (V_2 \cdot u)u$$

wherein u is a unit vector associated with vector $V_1$;
    finding a first normal vector $n_1$ orthogonal to $V_1$, where $n_1$ is a unit vector associated with the cross product of vectors $V_1$ and $V_3$; and
    defining said first plane with said normal vector n and said first point $P_1$;
    finding a first shortest path curve C on said first plane wherein said curve C is defined by an intersection of the surface and said first plane, wherein said first shortest path curve C is bounded by said first point $P_1$ and said second point $P_2$, and wherein a first length of said first shortest path curve is recorded;
    defining a subsequent plane containing said first point $P_1$ and said second point $P_2$, wherein said first normal vector $n_1$ is at an angle theta to a subsequent normal vector $n_x$ defining said subsequent plane at said first point;
    finding a subsequent shortest path curve $C_x$ on said subsequent plane wherein said curve $C_x$ is defined by the intersection of the surface with said subsequent plane, wherein said subsequent shortest path curve is bounded by said first point $P_1$ and said second point $P_2$, and wherein a subsequent length of said subsequent shortest path curve is recorded;
    repeating said step of defining said subsequent plane and finding a subsequent shortest path curve $C_x$ for angles theta between 0 and 180 degrees; and
    determining a minimum shortest path length from said first length and subsequent lengths.

7. The method of claim 6, wherein said step of selecting a first point $P_1$, second point $P_2$ and third point $P_3$ on the surface is accomplished at a graphical user interface where a user can specify said points on the surface of the 3D object.

8. The method of claim 6, wherein said step of repeating said step of defining said subsequent plane and finding a subsequent shortest path curve $C_x$ for an angle theta between 0 and 180 degrees comprises:

incrementing said angle theta by an increment angle, delta theta, from 0 to 180 degrees.

9. The method of claim 8, wherein a user can specify a increment angle delta theta.

10. The method of claim 6, wherein the 3D object is a biological tissue.

11. The method of claim 6, wherein the 3D object is a computer simulation of a surface of an object.

12. The method of claim 6, wherein said computer simulation is the result of mapping imaging data.

13. The method of claim 12, wherein said imaging data is MRI or positron emission topography data.

14. A system for determining the shortest planar path bounded by two points on a geodesic surface comprising:

a computer system that executes a software program comprising instructions for:

selecting a first and second point on the surface;

defining a first plane containing said first point and said second point;

finding a first shortest path curve on said first plane wherein said curve is defined by an intersection of the surface and said first plane and bounded by said first point and said second point, and wherein a first length of said first shortest path curve is recorded;

defining a subsequent plane containing said first point and said second point, wherein a first normal vector defining said first plane at said first point is at an angle theta to a subsequent normal vector defining said subsequent plane at said first point;

finding a subsequent shortest path curve on said subsequent plane wherein said curve is defined by the intersection of the surface with said subsequent plane and bounded by said first point and said second point, and wherein a subsequent length of said subsequent shortest path curve is recorded;

repeating said step of defining said subsequent plane and finding a subsequent shortest path curve for angles theta between 0 and 180 degrees; and determining a minimum shortest path length from said first recorded length and subsequent recorded lengths.

15. The system of claim 14 further comprising:

an inspection tool to model the 3D surface for input into said computer system.

16. The system of claim 15, wherein said inspection tool is an optical-, laser-, audio-, magnetic resonance or positron emission-based inspection system that render a representation of the geodesic surface.

17. The system of claim 15, wherein said 3D surface represents a biological tissue.

18. The system of claim 15, wherein said modeled 3D surface is a result of mapping imaging data.

19. The system of claim 14, wherein a completion time for determining said minimum shortest path length is inversely proportional to a size of an increment delta theta.

20. The system of claim 14, further comprising a graphical user interface wherein said step of selecting a first and second point on the surface is accomplished at said graphical user interface.

* * * * *